May 28, 1968   R. J. KLEINHANS ET AL   3,385,407
CLUTCH MECHANISM FOR COUNTER DRIVE
Filed Jan. 10, 1966   2 Sheets-Sheet 1
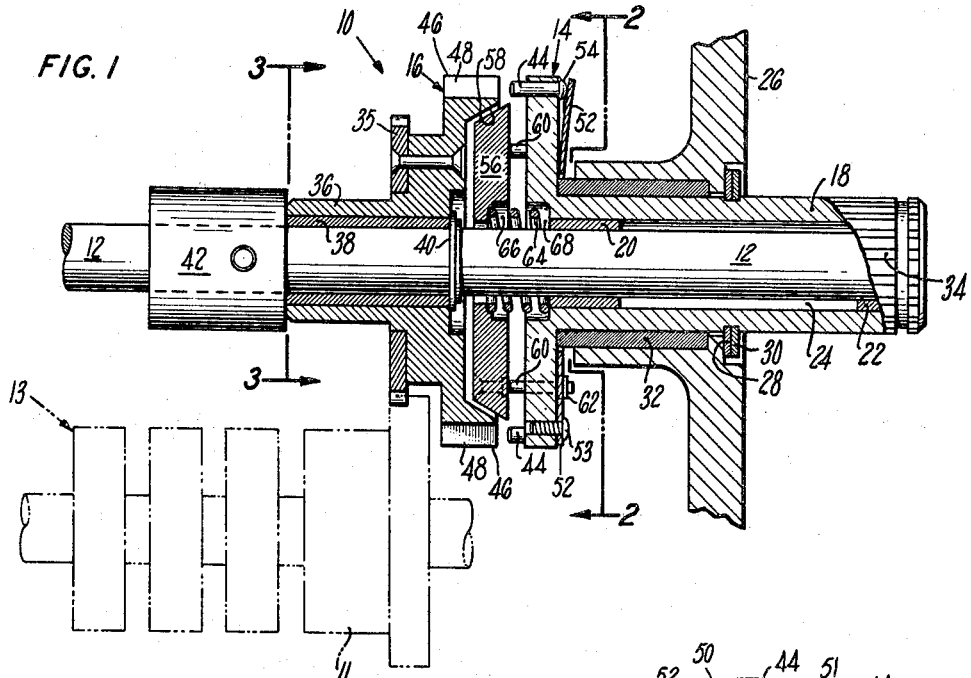
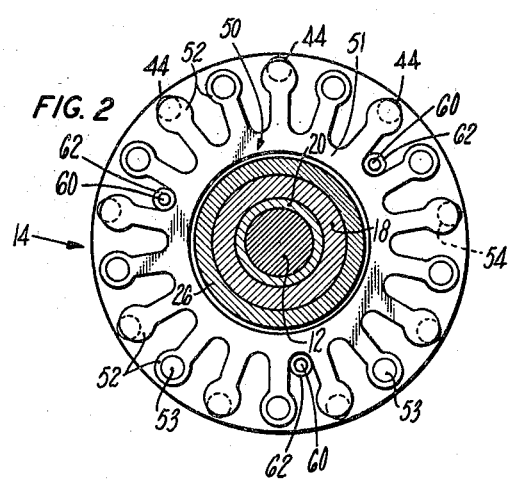
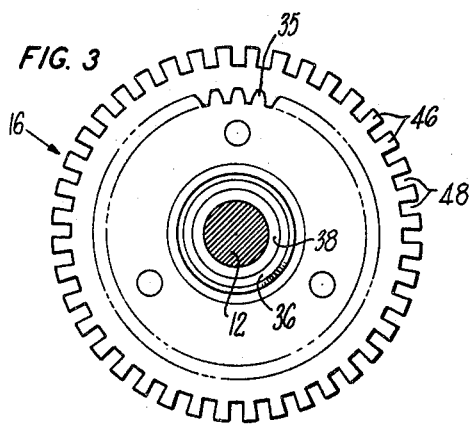
INVENTORS
ROBERT J. KLEINHANS
ARTHUR J. WELLS
JOHN H. BICKFORD
BY *Lindsey, Prutzman and Hayes*
ATTORNEYS INVENTORS
ROBERT J. KLEINHANS
ARTHUR J. WELLS
JOHN H. BICKFORD
BY Lindsey, Prutzman and Hayes
ATTORNEYS

United States Patent Office 3,385,407
Patented May 28, 1968

3,385,407
CLUTCH MECHANISM FOR COUNTER DRIVE
Robert J. Kleinhans, Cheshire, Arthur J. Wells, Hartford, and John H. Bickford, Middletown, Conn., assignors to Veeder Industries Inc., a corporation of Connecticut
Filed Jan. 10, 1966, Ser. No. 519,512
10 Claims. (Cl. 192—53)

ABSTRACT OF THE DISCLOSURE

A clutch mechanism having primary utility for engaging and disengaging the drive to a counter and having a driven clutch element with a plurality of equiangularly spaced fixed clutch teeth and a driving clutch element with a plurality of equiangularly spaced teeth that are individually reciprocably mounted for axial withdrawal if they abut the teeth of the driven clutch element as the clutch is engaged. The number of clutch teeth on the driven clutch element is greater than and unevenly divisible by the number of teeth on the driving clutch element such that the clutch is adapted to be engaged by a single tooth on the driving clutch element. In the embodiment of FIG. 1 the clutch teeth on the driving clutch element are axially reciprocable pins biased to an extended position by a spider spring, and a cone friction clutch provides a friction drive prior to the clutch tooth engagement.

In the embodiment of FIG. 4 the clutch teeth on the driving clutch members are integrally formed on the outer radial ends of the spider spring and a pair of radially spaced concentric rims on the driving clutch member are provided with aligned radial slots receiving the driving clutch teeth.

---

This invention relates to clutches usable in counter drives and particularly concerns clutch mechanisms for disconnecting a counter drive as for zeroizing the counter wheels of a counter.

A primary aim of the invention is to provide an improved clutch mechanism particularly suited for use in a drive train of a counter which is adapted to be disengaged as for resetting the counter and to be re-engaged without introducing an unacceptable error in the counter.

Another object of the invention is to provide an improved clutch mechanism of the type described having a pair of rotary axially disengageable clutch members which may be re-engaged under either static or dynamic conditions without excessive angular displacement between the clutch members.

A further object of the invention is to provide an improved clutch mechanism for a counter drive having tooth pitches on the clutch members which are related to ensure reliable clutch engagement without excessive angular displacement between the clutch members.

Another object of the invention is to provide an improved clutch mechanism for a counter drive which is adapted to provide 100% probability of engagement of the clutch members.

A further object of the invention is to provide a clutch mechanism for a counter wheel which is of compact and economical construction and which is capable of providing improved reliability of operation over a long service life.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a longitudinal view, partly broken away and partly in section, showing a counter in broken lines and an embodiment of a counter drive clutch mechanism of the invention in full lines;

FIG. 2 is a transverse section view taken along line 2—2 of FIG. 1, showing a driving clutch member of the clutch mechanism;

FIG. 3 is a transverse section view taken along line 3—3 of FIG. 1, showing a driven clutch member of the clutch mechanism;

Figure 4:
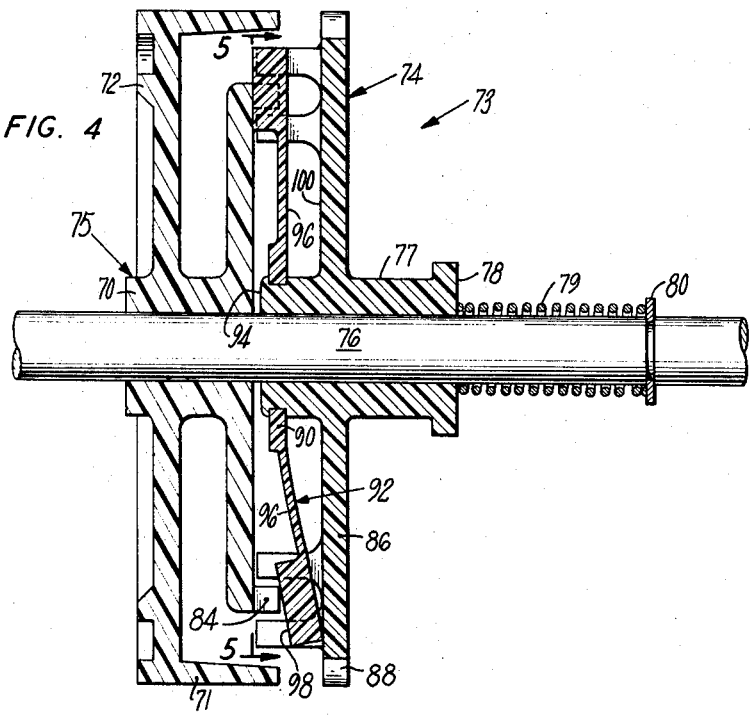
FIG. 4 is a longitudinal view, partly broken away and partly in section, showing a counter wheel assembly with another embodiment of a clutch mechanism of the invention.

Referring now to the drawings in detail and in particular to the embodiment of the invention shown in FIGS. 1–3, a clutch mechanism 10 is shown constructed for use in a counter drive of the type disclosed in copending patent application Ser. No. 384,104 of Michael S. Juhas, filed July 21, 1964, and entitled, "Counter Reset Mechanism," now U.S. Patent No. 3,244,368. Clutch mechanism 10 is illustrated as being mounted on a reset shaft 12 which may be axially shifted, for disengaging and re-engaging the counter drive to the lowest order counter wheel 11 of the counter 13, and which may be rotated to reset the counter as described in the referenced application Ser. No. 384,104. A pair of rotary driving and driven clutch members 14, 16 are coaxially mounted for disengaging and re-engaging the counter drive as in copending patent application Ser. No. 427,238 of Michael S. Juhas, filed Jan. 22, 1965, and entitled, "Counter Drive Clutch Mechanism," now U.S. Patent No. 3,301,363.

An integrally formed hub 18 of the driving clutch member 14 supports one end of the reset shaft 12 with bearings 20, 22 fitted inside a central bore 24 of the hub 18. Driving clutch member 14 is retained against axial displacement relative to a side wall of a counter housing 26 by a pair of locking rings 28, 30 and by a bushing 32 received within an opening in the housing 26. One end of the hub 18 is shown splined at 34 for receiving a counter drive gear, not shown, for rotating the driving clutch member 14. As in the referenced applications Ser. Nos. 384,104 and 427,238, the lowest order counter wheel 11 is driven by a spur gear 35 coaxially secured to the driven clutch member 16. A hub portion 36 of the driven clutch member 16 is supported for rotation on a coextending bearing 38 mounted on the reset shaft 12. The driven clutch member 16 is free to rotate relative to the reset shaft 12 but is fixed for axial displacement with the reset shaft by a snap ring 40 and a thrust sleeve 42 suitably secured to the reset shaft.

The driven clutch member 16 may therefore be axially shifted with the reset shaft 12 relative to the driving clutch member 14 to the position shown in FIG. 1 for disengaging the coacting clutch teeth 44, 46 of the clutch members 14, 16. The clutch teeth or pins 44 on the driving clutch member 14 are illustrated mounted for reciprocal movement in equiangularly spaced axially extending openings in the driving clutch member 14. The clutch teeth 46 on the driven clutch member 16 are shown formed by a plurality of equiangularly spaced slots 48 hobbed in the peripheral edge of the clutch member 16. On the outer face of the driving clutch member 14 is a spider spring 50 of resilient sheet material having a central ring 51 and a number of radially extending spring fingers 52. Alternate spring fingers 52 are fastened to the driving clutch member 14 as with screws 53, and the remaining alternate spring fingers engage enlarged heads 54 of the pins 44 for biasing the pins to their extended positions shown in FIG. 1. Thus, when the clutch members 14, 16 are relatively displaced to an axially engaged position, the pins 44 which are not in alignment with slots 48 are adapted to be withdrawn against the bias of the spider spring 50.

As described in the referenced application Ser. No. 427,238, it is desirable to minimize or eliminate the relative angular displacement between the driving and driven clutch members 14, 16 which is necessary for re-engaging the clutch so as to re-engage the counter drive without introducing an error into the counter. The clutch members 14, 16 are therefore adapted for positive engagement at all relative angular positions of the driving and driven clutch members or, in the alternative, with only insignificant relative angular displacement therebetween. In the specific illustrated embodiment of FIGS. 1–3, the driven clutch member 16 has forty teeth and the driving clutch member 14 has nine teeth or pins to provide a clutch mechanism 10 having 360 positions of engagement at angular increments of 1°. A greater number of teeth are provided on the clutch member 16 than on the clutch member 14, and the clutch member 16 has an even number of teeth in contrast to an odd number of teeth on the clutch member 14. Moreover, the pins 44 and teeth 46 are preferably dimensioned so that only one of the pins 44 will be received within a slot 48 at a time, and so that the remaining spring biased pins 44 are displaced to a retracted position when the clutch is engaged. For this reason it is preferable that the number of teeth 46 be unevenly divisible by the number of pins.

The relationship between the numbers of teeth on the clutch members 14, 16 may be in accordance with the expression $A=B\pm1$ where A is the number of teeth on one of the clutch members and B is the number of teeth on the other clutch member. For example, if twenty teeth were provided on one clutch member and twenty-one teeth were provided on the other clutch member in accordance with this formula, 420 different combinations of engagement would exist and the clutch could therefore be engaged at angular increments of 0.86°. However, in the type of clutch shown in FIGS. 1–3, it is desirable from a manufacturing standpoint to use more teeth 46 and fewer pins 44 than expressed by the above formula. Thus in the embodiment of FIGS. 1–3 there are nine pins 44 and forty teeth 46; i.e. an arrangement whereby the number of pins 44 and the number of teeth 46 are not evenly divisible by a common whole number greater than one. The above formula can be modified, for example, to $A=KB\pm1$ where K is a whole number greater than one so that the number of teeth A on one clutch member is equal to a multiple of the number of teeth B on the other clutch member, $\pm1$. Thus, if it were desired to provide approximately 400 engagement positions at angular increments of less than 1°, there could be nine teeth B on the driving clutch member 14 and forty-four teeth A on the driven clutch member 16 which would provide 396 positions of engagement at angular increments of 0.92°. It will be seen that in this example, as well as in the other examples, there still is an odd number of teeth on one of the clutch members and an even number of teeth on the other clutch member; that the larger number of teeth on one of the clutch members is unevenly divisible by the smaller number of teeth on the other clutch member; and that the numbers of teeth on the respective clutch members are not evenly divisible by a common whole number greater than one. Where desired however the number of teeth on each of the clutch members in each of the previous examples could be doubled or tripled etc. to provide for the engagement of two or more teeth as when the clutch is used to transmit a larger drive torque.

The determination of the number of teeth on the respective clutch members 14, 16 may depend upon a number of manufacturing considerations in addition to the desired incremental accuracy of the clutch. Thus the practical size limitations of the component parts and the amount of angular "play" or backlash which is desired are factors to be considered in any particular application. If it is desired to minimize the angular backlash between the clutch members, the design tolerances may be held to a practical minimum and/or the number of coacting teeth may be increased to decrease the maximum angular increment of engagement.

On the other hand, a slight increase in backlash or play between the clutch members may be used to increase the probability of engagement significantly. More specifically, the probability that a pin 44 will enter a slot 48 upon re-engaging the clutch may be determined mathematically by the expression $$P=\frac{c(A)(B)}{360}$$

where c is the total angular "play" or backlash in degrees, A is the number of teeth on one of the clutch members, and B is the number of teeth on the other clutch member. Thus one can determine the "play" or angular backlash c required for 100% probability of engagement by making P in the above expression equal to or greater than 1.0 and preferably greater than 1.0, for example 1.02, to prevent the possibility of interference between the teeth on the clutch members when the clutch is engaged.

So that the clutch mechanism 10 may be adapted for a variety of clutching applications including reliably accurate re-engagement of the clutch members 14, 16 under dynamic conditions, a cone friction clutch element 56 is coaxially mounted on the driving clutch member 14 for engaging a complementary conical clutch element 58 formed on the adjacent face of the driven clutch member 16. The friction clutch element 56 is mounted for relative axial movement between the clutch members 14, 16 by axially reciprocable rods 60 rigidly fixed to the friction clutch element 56 and axially extending therefrom through openings formed in the driving clutch member 14. An enlarged head 62 is formed on the outer end of each rod 60 which is engageable with the outer face of the driving clutch member 14 for limiting the axial extension of the friction clutch element 56 relative to the driving clutch member 14. When the clutch mechanism 10 is in its disengaged position shown in FIG. 1, the friction clutch element 56 is urged into a fully axially extended position by a coil compression spring 64 mounted between the friction clutch element 56 and the driving clutch member 14 and encircling the reset shaft 12. Oppositely facing recesses 66, 68 are formed in the friction clutch element 56 and the driving clutch member 14 to provide for receiving the compression spring 64.

When the reset shaft 12 is axially shifted to couple the clutch members 14, 16, the friction clutch element 56 engages the mating conical element 58 on the driven clutch member 16 before the clutch members 14, 16 are brought into positive engagement, e.g., for accelerating the driven clutch member 16 to substantially the same angular velocity as the driving clutch member 14 when the clutch mechanism 10 is engaged under dynamic conditions. As the driven clutch member 16 continues to be moved toward the driving clutch member 14 by the reset shaft 12, the friction clutch element 56 is forced toward the driving clutch member 14 in opposition to the force of the compression spring 64, and when the clutch mechanism 10 is fully engaged, the driven clutch member 16 is engaged by both the friction clutch element 56 and by the driving clutch member 14.

In addition to minimizing or eliminating shock loading when a pin 44 engages a slot 48 under dynamic conditions, the friction clutch element 56 may be used as a primary clutch for driving the counter without backlash, in which instance the positive engagement clutch members are employed to prevent excessive slippage when the maximum torque of the friction clutch is exceeded.

In this instance, it would be preferable that the number of teeth on the positive engagement clutch members be designed for 100% probability of engagement. The positive engagement clutch members and the cone friction clutch would thus provide complementary coupling actions which are highly adaptable for each particular application.

Figure 5:
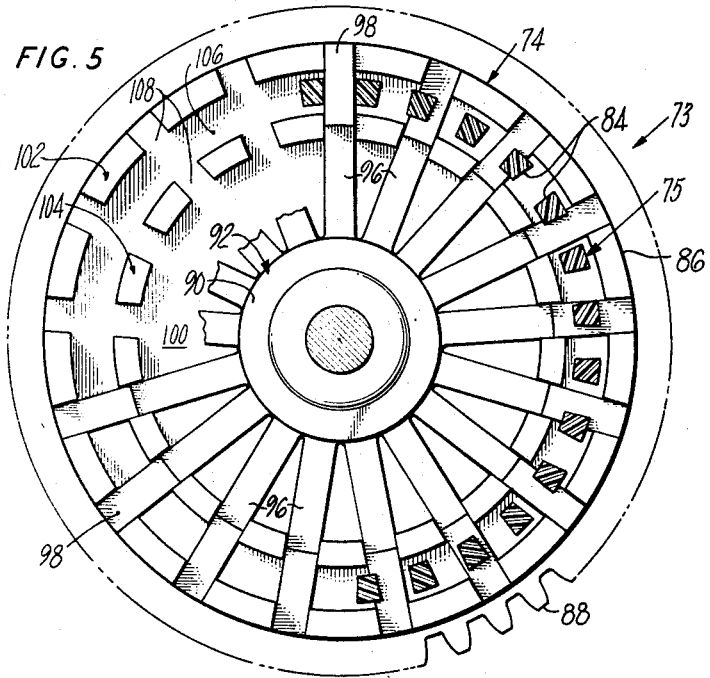
FIG. 5 is a transverse section view, partly broken away, taken generally along line 5—5 of FIG. 4.

Referring now to that embodiment of the invention illustrated in FIGS. 4 and 5, a counter number wheel assembly is shown having a hub 70, a rim 71 and an intermediate web 72 formed integrally with the hub and connecting the rim thereto. A clutch mechanism 73 for the number wheel is shown having coaxial driving and driven clutch members 74 and 75. In the specific illustrated embodiment, the driven clutch member 75 is integrally formed with the wheel hub 70 and the driving clutch member 74 is adapted for axial displacement relative to the driven clutch member 75 by means of a collar 77. The outer end 78 of the collar 77 is shown employed as a seat for one end of a coil compression spring 79 having its opposite end engaging a ring 80 secured to a number wheel shaft 76 for biasing the driving clutch member 74 into engagement with the driven clutch member 75 as shown in FIG. 4. Of course, an alternative arrangement could be provided wherein the driven clutch member 75 could be axially shifted as by the number wheel shaft 76 for disengaging and re-engaging the clutch.

The driven clutch member 75 is shown provided with a plurality of teeth 84 axially extending toward the driving clutch member 74 and equiangularly spaced in an annular arrangement around the peripheral edge of the driven clutch member 75. The driving clutch member 74 is provided with a circular housing 86 formed integrally with and extending radially outwardly from the collar 77 intermediate its axial ends. The housing 86 is shown having a peripheral spur gear portion 88 as for indexing the number wheel when the clutch is engaged. A central ring 90 of a resilient spider spring 92 is secured to adjacent an inner end 94 of the collar 77 in axially spaced relation to the housing 86, and a number of equiangularly spaced fingers 96 extend radially outwardly from the central ring 90. Each finger 96 has an enlarged tooth or free end 98 positioned the same radial distance from the hub 90 and projecting axially toward the driven clutch member 75 for engagement with the clutch teeth 84.

Integrally formed in an annular arrangement on an inner face 100 of the housing 86 are a pair of radially spaced concentric rims 102 and 104 projecting axially toward the driven clutch member 74. Rims 102, 104 define an intermediate annulus 106 for receiving the teeth 84 of the driven clutch member 75. The rims 102 and 104 have aligned radial slots 108 for receiving the radially extending fingers 96 and for transmitting the drive torque between the clutch members without placing a torsional bias on the resilient fingers 96. The rims 102, 104 also serve to assist in angularly locating the teeth 98 and guiding the axial displacement of the fingers 96 of the spider spring 92 during the engagement and disengagement of the clutch.

The clutch mechanism 73 is provided with seventeen teeth 98 on the driving clutch member 74 and twenty-eight teeth 84 on the driven clutch member 75 so as to effect clutching engagement with minimal angular displacement between the clutch members. When the clutch members 74, 75 are in the fully engaged operative position shown in FIG. 4, one of the teeth 98 of the resilient spider spring 92 will find a space between an adjacent pair of teeth 84 on the driven clutch member 75 and the remaining nonaligned teeth 98 will be axially retracted within their respective slots 108 in the rims 102, 104. When it is desired to reset the number wheel, the driving clutch member 74 is axially displaced in opposition to the biasing force of the compression spring 79, and the clutch members 74, 75 will be disengaged to disconnect the number wheel. This permits the nonaligned teeth 98 to be returned to their normal positions by the resilient fingers 96 so as to be available when the clutch is re-engaged.

The clutch mechanism 73 is particularly suited for convenient and economical manufacture and assembly whereby the clutch members 74, 75 may be molded of a suitable plastic such as "Delrin." By virtue of the inherent torsional resilience provided in the above described structure, a resilient clutching action with appropriate backlash can be assured for accommodating either a high or low torque drive and for providing the desired probability of engagement in accordance with the formula previously described.

A clutch mechanism constructed in accordance with this invention is capable of being re-engaged under either static or dynamic conditions with minimal angular displacement between the clutch members. In addition to providing a desired incremental accuracy of the clutch so as to re-engage a counter drive train, e.g., without introducing excessive error in the counter, the clutch members may be readily adapted for 100% probabiilty of engagement. Finally, the superior operating characteristics provided by the above described clutch mechanism are obtained in a compact structure which may be conveniently manufactured and assembled at low cost to provide long reliable service.

As will be apparent to persons skilled in the art, various modifications and adaptations of the structure above described will become readily apparent without departure from the spirit and scope of the invention, the scope of which is defined in the appended claims.

We claim:

1. A counter drive clutch comprising first and second coaxial rotary clutch members each having a plurality of equiangularly spaced clutch tooth means annularly arranged for selective positive engagement by relative axial movement of the rotary clutch members from a relatively withdrawn position to a relatively engaged position, the number of clutch tooth means of said first clutch member being greater than and unevenly divisible by the number of clutch tooth means of said second clutch member, and the second clutch member having means providing for individual axial retraction of its clutch tooth means upon abutment with the clutch tooth means of the first clutch member as the clutch members are axially moved to their relatively engaged position.

2. The clutch of claim 1 further comprising a pair of coaxial rotary friction clutch elements mounted for rotation with the first and second clutch members respectively, means for mounting at least one friction clutch element for axial movement relative to its respective clutch member between a relative axially extended position providing engagement with the other friction clutch element prior to the selective engagement of the tooth means of the first and second clutch members, and a relative axially wtihdrawn position providing engagement of both the friction clutch elements and the tooth means of the first and second clutch members, and spring means biasing said one friction clutch element toward its axially extended position.

3. The clutch of claim 1 wherein the clutch tooth means of the clutch members are adapted to provide an angular backlash in degrees greater than the quotient or 360 divided by the product of the numbers of clutch tooth means of the clutch members to provide 100% probability of engagement of the clutch tooth means when the clutch tooth means of the clutch members are moved to their relatively engaged position.

4. A counter drive clutch comprising first and second coaxial rotary clutch members each having a plurality of equiangularly spaced clutch tooth means annularly arranged for selective positive engagement by relative movement of the clutch tooth means from a relatively withdrawn position to a relatively engaged position, the number of clutch tooth means of said first clutch member being greater than and unevenly divisible by the number of clutch tooth means of said second clutch member, the clutch tooth means of one of the clutch members including a plurality of angularly spaced clutch teeth respectively mounted thereon for reciprocable movement between an extended position and a retracted position relative to the clutch tooth means of the other clutch member, and a spider spring having a central ring and a plurality of resilient fingers extending radially outwardly from the central ring and connected to the clutch teeth of said one clutch member for biasing them toward their extended position for selective positive engagement with the clutch tooth means of said other clutch member when the tooth means of the clutch members are displaced from their relatively withdrawn position to said relatively engaged position.

5. The clutch of claim 4 wherein the clutch teeth of said one clutch member are integral with said spider spring and disposed at equal radial distances from its central ring at the outer extremities of said radially extending fingers for selective positive engagement with the clutch tooth means of said other clutch member.

6. The clutch of claim 5 wherein said one clutch member further includes a housing for the spider spring having annular rim means projecting toward said other clutch member and spaced from the clutch tooth means thereof, said rim means having radially directed slots therein for receiving the radially extending fingers of the spider spring for transmitting torque between the clutch members.

7. A clutch comprising first and second coaxial clutch members relatively axially displaceable for positive engagement and disengagement, said clutch members each having a plurality of equiangularly spaced clutch tooth means annularly arranged for selective positive engagement, the number of clutch tooth means of said first clutch member being greater than and unevenly divisible by the number of clutch tooth means of said second clutch member, the clutch tooth means of said second clutch member including pins adapted for reciprocal movement between extended and retracted positions relative to the clutch tooth means of said first clutch member and biasing means for urging the pins toward their extended position for selective positive engagement with the clutch tooth means of said first clutch member.

8. The clutch of claim 7 further comprising a first friction clutch element, means coaxially supporting the first friction clutch element on one of the clutch members for rotation therewith and for coaxial displacement relative thereto between a withdrawn position and an extended position, a second friction clutch element on the other clutch member engageable by the first friction clutch element, and spring means for biasing the first friction clutch element into engagement with the second friction clutch element prior to the positive engagement of the cluch members for accelerating said other clutch member to substantially the same angular velocity as said one clutch member to provide an essentially shock-free clutch action under dynamic conditions.

9. A clutch comprising a first clutch member, and a second clutch member coaxial with the first clutch member and relatively axially displaceable from the first clutch member for positive engagement and disengagement of the clutch, one of the clutch members having a plurality of annularly arranged equiangularly spaced clutch teeth, the other of said clutch members having a housing and a spider spring disposed between the housing and said one clutch member, and said spider spring including a plurality of radially extending resilient fingers having clutch teeth integrally formed on the outer extremities thereof for selective positive engagement with the clutch teeth on said one clutch member.

10. The clutch of claim 9 wherein the housing includes a pair of radially spaced concentric rims projecting axially toward said one clutch member and defining an annulus for receiving the clutch teeth thereof, said pair of rims having aligned radial slots therein for receiving the radially extending fingers of the spider spring for transmitting torque between the clutch members.

References Cited
UNITED STATES PATENTS

| | | | |
|---|---|---|---|
| 1,142,787 | 6/1915 | Landsiedel. | |
| 1,727,815 | 9/1929 | Dinsmore | 235—144 |
| 2,554,740 | 5/1951 | Jellis et al. | 192—53.2 X |
| 2,807,343 | 9/1957 | Ryder et al. | 192—53.2 |
| 3,204,731 | 9/1965 | Bent et al. | 192—67 |
| 3,223,323 | 12/1965 | Lawless et al. | 235—144 |

DONLEY J. STOCKING, *Primary Examiner.*

ARTHUR T. McKEON, *Examiner.*